Oct. 14, 1941.  A. K. BREWER ET AL  2,258,594
METHOD AND APPARATUS FOR SEPARATING GASES AND ISOTOPES
Filed Aug. 18, 1939
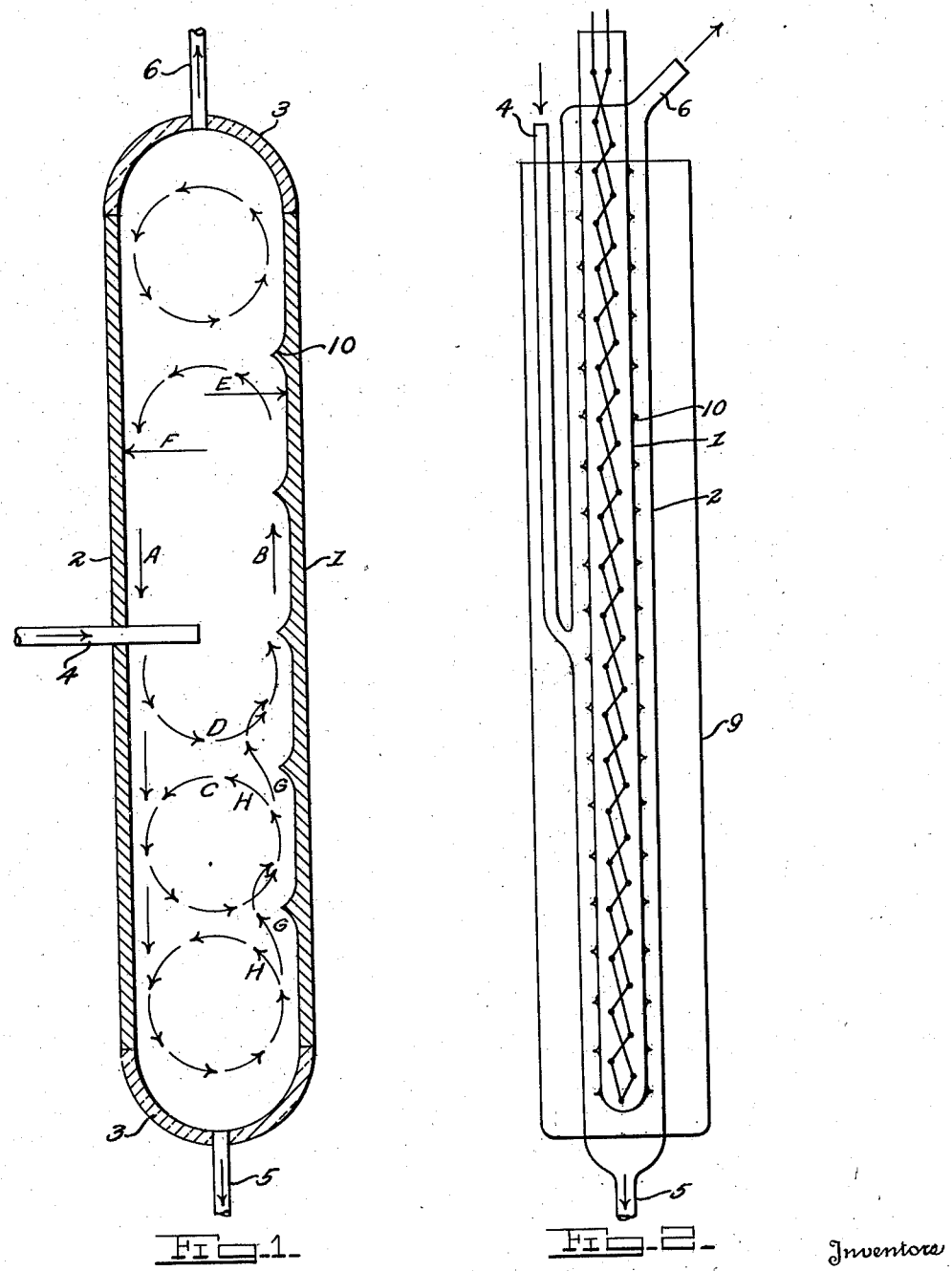
Inventors
A. BRAMLEY
A. K. BREWER Patented Oct. 14, 1941

2,258,594

UNITED STATES PATENT OFFICE 2,258,594

METHOD AND APPARATUS FOR SEPARATING GASES AND ISOTOPES

Aubrey Keith Brewer, Washington, D. C., and Arthur Bramley, Ocean City, N. J., assignors to Claude R. Wickard, as Secretary of Agriculture of the United States of America, and to his successors in office Application August 18, 1939, Serial No. 290,746

4 Claims. (Cl. 183—115)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

Our invention relates to methods and apparatus for separating gases and isotopes. It has decided advantages in simplicity and low cost of operation, cheapness of construction, and the small amount of materials required, while at the same time efficient in operation.

The present invention relates to a process and apparatus for the separation of isotopes by thermal means.

At the present time there is an imperative need for an abundant supply of natural isotopes. This need exists in the field of agriculture, medicine, and chemistry.

1. An object of our invention is the separation of gases having different molecular weights.

2. Another object of our invention is the separation of the isotopes of the elements.

3. Another object of our invention is the separation of vapors of liquids having similar boiling points but different molecular weights.

4. Still another object of our invention is the preparation of concentrated isotopes of the various elements for use as "tracers" in studying the movements and availability of these elements in soil and fertilizers.

5. Still another object of our invention is the preparation of concentrated isotopes of the various elements to be used as "tracers" so as to follow their movement through metabolic processes in plants and animals.

6. Still a further object of our invention is the preparation of pure isotopes to permit the study of the biological activity of particular isotopes in a given organism.

7. Still a further object of our invention is the preparation of pure radioactive potassium and rubidium as a substitute for present sources of radioactivity used in the treatment of cancer, and various diseases which respond to radium or X-ray treatment.

8. Still a further object of our invention is the preparation of radioactive potassium and radioactive rubidium as substitutes for other radioactive elements in various industrial processes.

9. Still a further object of our invention is the separation of the isotopes of the elements to be used as targets for nuclear distintegration work.

10. Still a further object of our invention is the separation of the isotopes of the elements to be used as projectiles in nuclear disintegration work.

Three previous methods have been reported for the separation of isotopes and gases with different molecular weight by thermal means.

First, Chapman and Dootson (Phil. Mag. vol. 34, p. 248, 1917), showed that in a tube, one end hot and the other cold, the lighter gas will be concentrated to a few percent in the heated portion of the tube, due to thermal diffusion.

Second, Clusius and Dickel (Natur Wiss. vol. 26, p. 546, 1938), using a heated wire extending down the center of a long vertical tube, containing a gas reservoir at either end, obtained an enhanced concentration of the lighter molecules in the upper reservoir and the heavy in the lower. The principle of separation is that, at any cross section in the tube, thermal diffusion will induce a higher concentration of the light molecules adjacent to the wire and the heavy molecules adjacent to the outer wall. Since the light gas is hotter it will rise along the heated wire while the cold gas will fall along the cold wall. This results in a smooth stream of light gas flowing upward along the hot wire to enter the top reservoir and the cold downward to enter the bottom reservoir. By this process it is possible to multiply the separation obtained by Chapman and Dootson by a factor depending on the length of the tube.

Third, Bramley and Brewer (Physical Rev., vol. 55, p. 590A, 1939), devised an apparatus consisting of two uniform vertical concentric tubes, the inner being heated and the outer cooled; in operation the light molecules are concentrated at the top of the tube and the heavy from the bottom where they can be drawn off. In this device heat is transferred through the gas from the hot to the cold wall by a series of adjacent swirls lying one above the other throughout the length of the tube. Two factors contribute to the final gas separation in this type of apparatus. On account of the temperature difference between the walls the light component is slightly concentrated at the hot surface by thermal diffusion. On account of initial diffusion the light molecules upon being heated move away from the hot surface with a greater velocity than do the heavy; thus more light than heavy molecules will go ahead in the moving gas to be trapped by the overlying swirl. In consequence, there is a general movement of the light molecules from swirl to swirl up the tube, while the heavy molecules move downward. This results in an increase in the relative concentration of heavy to light molecules from the bottom to the top of the apparatus.

The present invention differs from the teachings of Chapman and Dootson because the method of separation is one depending primarily on difference in molecular velocities rather than on thermal diffusion. Another important difference of our invention over that of Chapman and Dootson is that we teach the use of accumulative action, whereas, Chapman, et al. rely solely upon thermal diffusion in a static system.

In addition to the foregoing, our invention differs from Clusius and Dickel in that by having the area of the heated surfaces as nearly equal as possible, heat is transferred from the hot to the cold surface by a series of swirls lying one above the other extending throughout the length of the tube. In the Clusius and Dickel apparatus, heat is transferred from a fine wire extending down the center of the tube to the outer wall by a vertical non-interrupted streamlined flow contant along the heated wire. Another important difference of our invention over that of Clusius and Dickel is that by the aid of baffles situated within the chamber, the swirling movement of the gases is enhanced and further restricted, obtaining a greater separation.

The present invention is similar in operation to that of Bramley and Brewer (Ser. No. 263,352, series of 1935), except for several improvements which materially enhance the amount, and the rate of separation.

Our invention is illustrated in the accompanying drawing in which similar numerals refer to similar parts throughout the views.

By referring to the drawing it will be seen that

Figure 1 is a cross-sectional view of our apparatus in which parallel flat walls are used.

Figure 2 is a cross-sectional view of our apparatus in which the walls are concentric tubes.

In Figures 1 and 2, wall 1 is adapted to be heated by some outside source of heat, such as an electrical heating unit, while wall 2 is adapted to be cooled, preferably by water, or some convenient cooling source. In Figure 1, gas tight thermal insulators 3 separate the two plates 1 and 2. Tube 4 is an inlet adapted for the gas mixture near the center of the gas volume. Outlet tubes 5 and 6 are adapted for drawing off the heavy and light components, respectively. Baffles 10 are illustrated in the form of corrugations. A cooling jacket 9 is so placed that the temperature of wall 2 is maintained at the desired value.

In Figure 1 the various gas movements are illustrated by lettered arrows.

The gas movements resulting in the separation of molecules according to their masses are illustrated in Figure 1. The conditions prevailing in an apparatus of the type illustrated in Figure 2 are identical.

In Figure 1, E represents a small drift due to thermal diffusion of the light gas component to the hot wall 1 and F, a drift of the heavy component to the cold wall 2. Arrows C and D represent the movement of gas between the plates in which heat is transferred from hot plate 1 to cold plate 2 by a series of swirls. Arrow C shows a hot stream of gas from plate 1 moving contiguous to and under a cold stream of gas from plate 2. Baffles 10 are so placed that the definition of the swirls is enhanced, while the overall movement of the gas is not interrupted. Arrows G and H represent the average movements of the light and heavy molecules, respectively, upon striking hot plate 1. In this process the light molecules acquire a greater thermal velocity than the heavy and hence will move ahead of the heavy molecules, hence more light than heavy molecules will be trapped by the overlying swirl moving in the direction D. This effect is also enhanced by thermal diffusion which increases the concentration of the light component at the hot wall. In consequence, the light gas is handed from underlying to overlying swirl at the hot surface, and the heavy from overlying to underlying swirl at the cold wall. The final result is an overall movement of the light gas to the top, and the heavy to the bottom of the apparatus; these movements build up a concentration gradient from the top to the bottom of the apparatus in which the ratio of heavy to light gas is greater at the bottom than at the top of the enclosed space. This concentration gradient continues to build up until the rate of back diffusion just balances the rate of separation.

It is to be understood that the wall clearance and gas pressure must be adjusted for different gases and length of tube to obtain a maximum separation. We have found that the gas separation is enhanced by a continuous flow method of operation, in which the light component is drawn off at the top, and the heavy, at the bottom, the original mixture being introduced at the center. To enhance the efficiency of operation, we may employ a series of corrugations or baffles 10 so placed along the tube walls 1 and/or 1 and 2 as to enhance swirl definition. We have also found that reservoirs retard the rate of separation of the gases and/or isotopes.

We have found that swirl definition is enhanced by constructing the apparatus so that the tube walls have, as nearly as possible, the same surface area, and the mass speed of gas separation is increased with the diameter of the tubes for a given wall clearance.

We have also found that in the separation of liquids, the optimum conditions are materially different from those of gases. The wall clearance should be of the order of a fraction of a millimeter instead of a centimeter.

We wish it to be understood that we do not desire to be limited to the exact details of construction shown and described in the accompanying drawing, for obvious modifications will occur to a person skilled in the art.

Having thus described our invention, what we claim for Letters Patent is:

1. That process of separating constituents of unequal molecular mass in a fluid mixture, which comprises subjecting a vertically elongated confined body of fluid to a temperature gradient transversely of said body, the while inducing a partial separation of the heavier and lighter components, and the while inducing a circulation of gas in an upwardly flowing direction in a region of higher temperature and in a downwardly flowing direction in a region of lower temperature, obstructing the direction flow of said streams at a plurality of points and thereby establishing a secondary circulation of fluid in a plurality of intercommunicating localized swirls, and the while withdrawing the heavier constituents from the bottom and the lighter from the top.

2. That process of separating constituents of unequal molecular mass in a fluid mixture, which comprises subjecting a vertically elongated confined body of fluid to a temperature gradient transversely of said body, the while inducing a partial separation of the heavier and lighter components, and the while inducing a circulation of gas in an upwardly flowing direction in a region of higher temperature and in a downwardly flowing direction in a region of lower temperature, obstructing the direction flow of one of said streams at a plurality of points and thereby establishing a secondary circulation of fluid in a plurality of intercommunicating localized swirls, and the while withdrawing the heavier constituents from the bottom and the lighter from the top.

3. In an apparatus of the character described, which comprises an elongated substantially vertical chamber consisting of oppositely opposed parallel walls, means for introducing constituents of unequal molecular mass in a fluid mixture into said chamber, means for heating one wall and means for cooling the wall opposite, means within said chamber adapted for forming obstructions to the natural flow of the mixture, thereby producing a series of localized swirls in the fluid, and lower and upper means adapted for withdrawing the heavier and lighter constituents.

4. An apparatus of the character described, comprising an elongated substantially vertically annular chamber, means for introducing constituents of unequal mass in a fluid mixture into the chamber, means for heating one wall of the chamber and cooling the opposite wall, obstructing means within said chamber and along the wall adapted to be heated, and a lower outlet for the heavier and an upper outlet for the lighter constituents.

AUBREY KEITH BREWER.
ARTHUR BRAMLEY.